United States Patent [19]

Tyner

[11] Patent Number: 5,613,835
[45] Date of Patent: Mar. 25, 1997

[54] FLOW CONTROL APPARATUS FOR A WATER POWERED SUMP PUMP

[76] Inventor: Leslie M. Tyner, 14 E. Hannum Blvd., Saginaw, Mich. 48602

[21] Appl. No.: 612,247

[22] Filed: Mar. 7, 1996

[51] Int. Cl.⁶ ............................................. F04F 5/48
[52] U.S. Cl. ...................... 417/182.5; 417/187; 137/414; 137/418
[58] Field of Search ................................. 417/182.5, 187, 417/188; 137/414, 418

[56] References Cited

U.S. PATENT DOCUMENTS

| | | | |
|---|---|---|---|
| D. 283,225 | 4/1986 | Canvasser . | |
| 318,185 | 5/1885 | Haydn . | |
| 380,941 | 4/1888 | Schutte | 417/182.5 |
| 424,553 | 4/1890 | Hoffman | 417/187 |
| 1,810,473 | 6/1931 | Gaines . | |
| 2,578,143 | 12/1951 | McGarry . | |
| 2,809,597 | 10/1957 | Fowler | 137/418 |
| 2,855,861 | 10/1958 | Miles et al. | 417/182.5 |
| 3,215,089 | 11/1965 | Hoffmann | 417/182.5 |
| 3,379,406 | 4/1968 | Greer . | |
| 3,963,376 | 6/1976 | Miskin | 417/182.5 |
| 4,060,341 | 11/1977 | Tremain et al. . | |
| 4,099,701 | 7/1978 | Berger . | |
| 4,482,299 | 11/1984 | Eulass | 417/187 |
| 4,963,073 | 10/1990 | Tash et al. . | |
| 4,967,996 | 11/1990 | Sonoda et al. . | |
| 5,302,088 | 4/1994 | Gronski et al. | 417/182.5 |

FOREIGN PATENT DOCUMENTS 918135 11/1945 France .................................... 137/414

Primary Examiner—Timothy Thorpe
Assistant Examiner—Roland G. McAndrews, Jr.
Attorney, Agent, or Firm—Learman & McCulloch

[57] ABSTRACT

A water powered sump pump has a flow control apparatus connected to a source of water under pressure and to a suction generator. Water from the flow control apparatus flows through a nozzle in the suction generator, creates a pressure drop, suck water in from a sump, and discharge water through a discharge line. The control apparatus has a variable pressure chamber and a constant pressure chamber. The constant pressure chamber is connected to a source of water under pressure and to the suction generator. A diaphragm separates the two chambers and opens and closes a passage between the water source and the suction generator. An orifice connects the two chambers. A bleed valve opens and closes the variable pressure chamber. A spring biased arm of an actuator assembly is biased in one direction to open the bleed valve, drop pressure in the variable pressure chamber, move the diaphragm and open the passage which permits flow to the suction generator. Spring biased arm is biased in another direction to close the bleed valve and move the diaphragm to stop flow to the suction generator. A control arm controls the direction the spring biased arm is biased. An adjustable float moves the control arm in response to changes in sump water level.

5 Claims, 3 Drawing Sheets

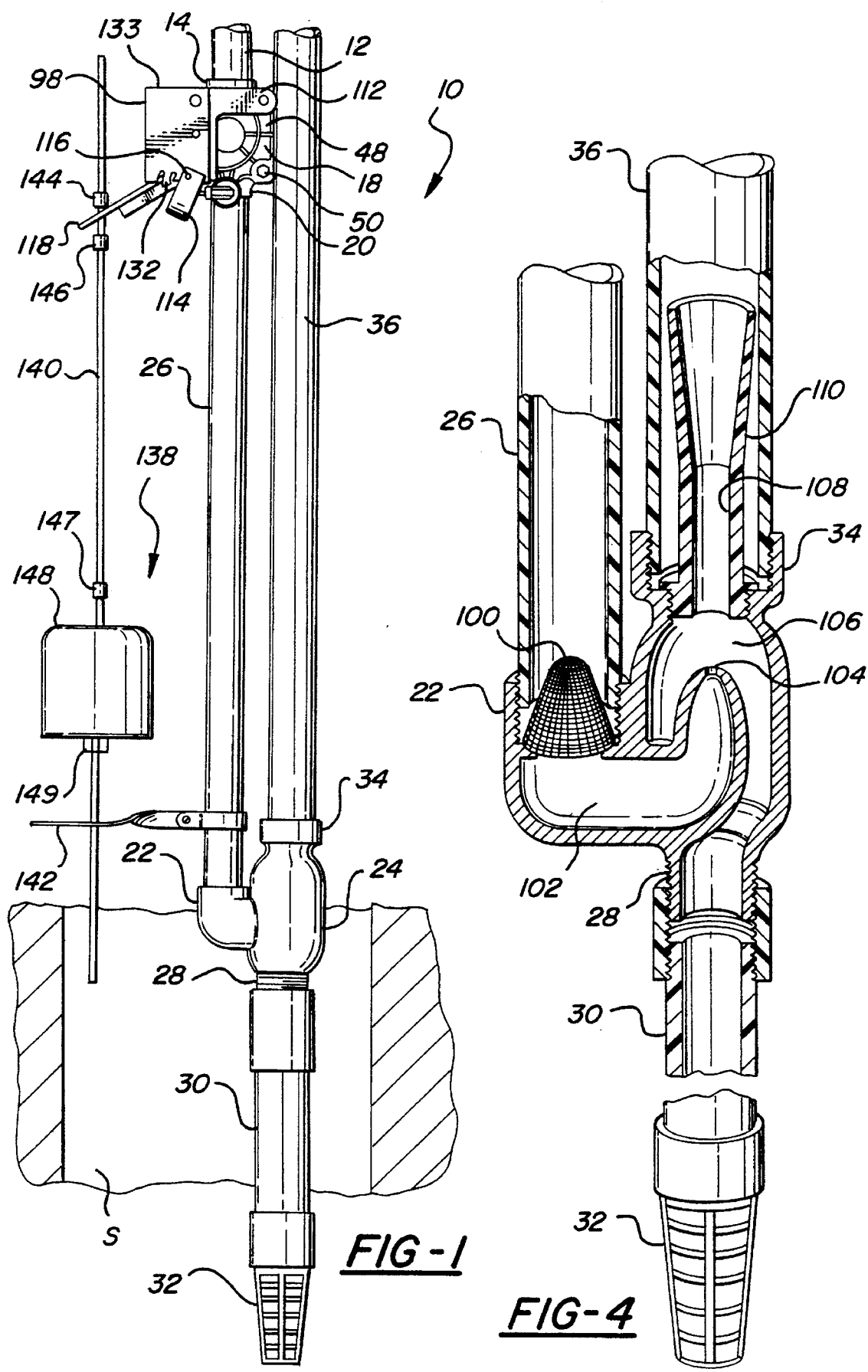

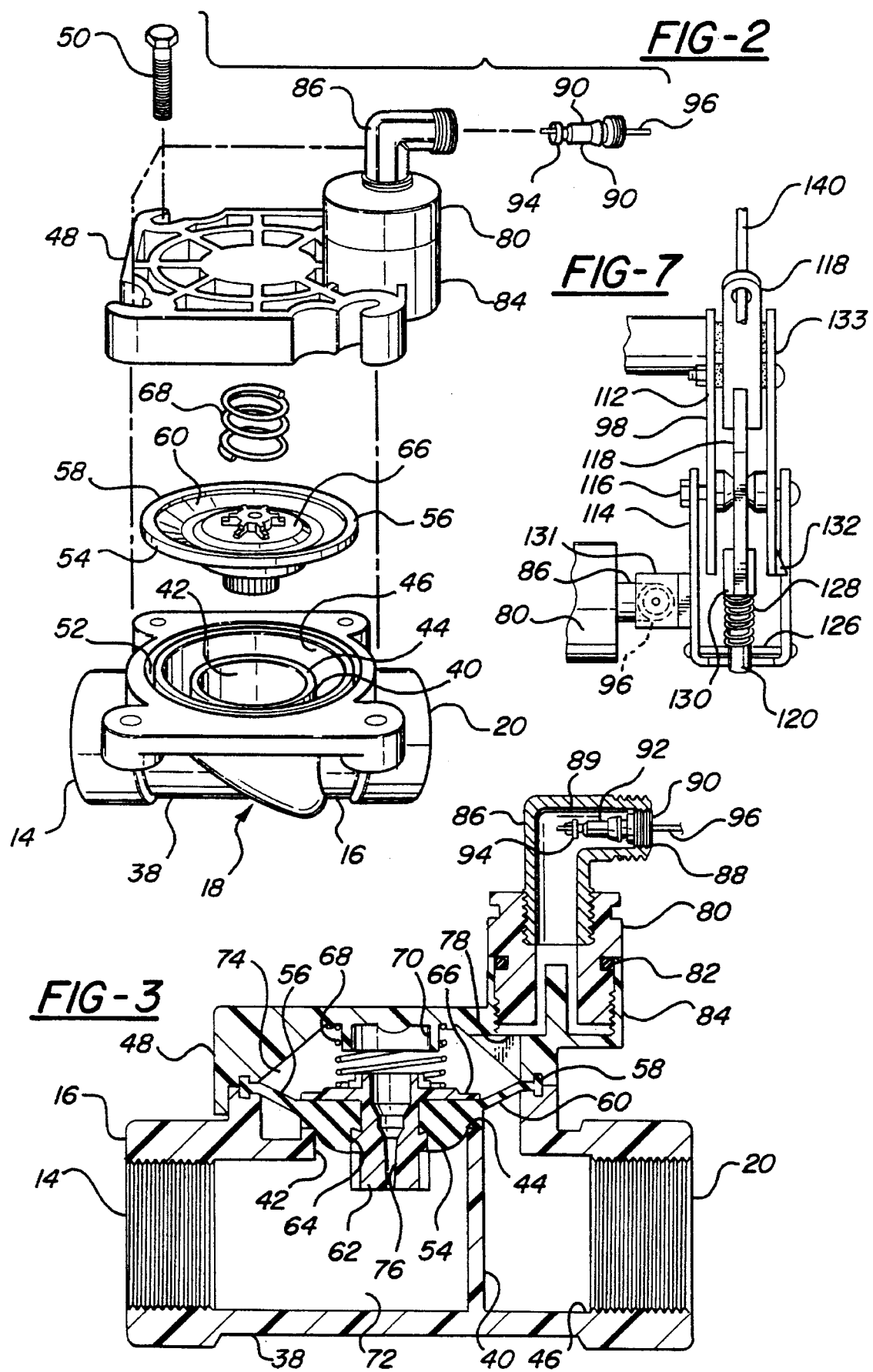

FLOW CONTROL APPARATUS FOR A WATER POWERED SUMP PUMP

This invention relates to a water powered pump that is well adapted for use in maintaining water in a sump at a selected level, and more particularly to a control mechanism for initiating and discontinuing the flow of water from a pressurized source to the pump.

BACKGROUND OF THE INVENTION

Water powered pumps have been employed in sumps in basements of residences and commercial buildings to prevent flooding of basements and the damage caused by such flooding. Sump pumps powered by pressurized water can eliminate requirements for electricity to sense water level and to power a motor that drives a pump. The complete elimination of electricity for sump pump operation is desirable because weather conditions which cause a rise in sump water level are likely also to cause electrical power failures.

Water powered pumps such as the pump shown in U.S. Pat. No. 5,302,088, the disclosure of which is incorporated herein by reference, work very well for discharging water from a sump. However, pump control systems that include a valve that is opened and closed by a float do not always work well. Corrosion and mineral deposits on valve components that occur over time, increase the force required to open and close a valve. The force available from a float usable in a confined sump is limited. Corrosion and deposits on a float over time and leakage of water into floats can also change the force a float can produce. The increase in the force required to open or close a control valve and changes in the force available from a float can lead to a situation in which the float is incapable of either opening or closing a valve that controls the supply of water under pressure to a water powered pump. A sump pump which is not turned on when water level in a sump rises to a high level, or is not turned off when the water level in a sump falls below a chosen low level is unsatisfactory.

Inspections and frequent maintenance can ensure the proper operation of a water powered sump pump. Unfortunately sump pumps are necessarily located in a sump where access for inspection and maintenance is difficult.

SUMMARY OF THE INVENTION

A sump pump constructed in accordance with the preferred embodiment of the invention comprises a flow controller apparatus having an inlet adapted for connection to a source of pressurized water, an outlet in communication with an outlet line, a bleed port, and a bleed valve; a suction generating apparatus having a pressurized water inlet in communication with the control housing outlet line, a drain line in communication with the lower portion of the sump in which water may collect, a discharge port connected to a discharge line in communication with a sewer or other disposal area; and a float operated actuator operable to open and close the bleed valve of the flow controller. Opening the bleed valve opens the flow controller and supplies pressurized water to the suction generating apparatus. Pressurized water flowing through the suction generating apparatus creates a suction, entrains water in the sump through the drain line, and carries entrained water out through a discharge line. Closing the bleed valve causes the flow controller to discontinue the flow of pressurized water to the suction generating apparatus. The bleed valve is opened and closed by a float operated actuator.

The flow control apparatus has a control apparatus housing with an internal partition which separates the water inlet from the water outlet. The partition has a passage therein through which water may flow. The passage normally is maintained closed by a diaphragm closure through which an orifice extends. The diaphragm divides the control housing into two compartments one of which is of substantially uniform pressure and the other of which is of variable pressure. The orifice in the diaphragm enables restricted flow of water from one chamber to the other. The diaphragm is urged toward its passage closing position by a spring. Opening the bleed valve of the flow controller reduces the pressure in the variable pressure chamber and opens the diaphragm thereby allowing the water to flow through the flow controller to the suction generating apparatus. Water entering the suction generator from the flow controller passes through a nozzle, across a low pressure chamber and through an injector. The high velocity movement of water into the injector reduces pressure in the low pressure chamber and sucks water into the low pressure chamber from the sump through the drain line. Water drawn into the low pressure chamber from the sump becomes entrained in the high velocity stream from the nozzle and is carried out through the injector to the discharge line.

The bleed valve in the bleed port of the flow controller is opened and closed by a spring biased arm pivotally supported in a float actuator assembly housing attached to the flow control apparatus housing. The spring biased arm is biased in one direction by a spring to move a valve release pin axially and lift a valve member off its valve seat thereby opening the bleed valve. The spring biased arm is biased in another direction by the spring to move the spring biased arm away from the bleed valve and allow an internal valve spring to move the valve member into contact with its valve seat thereby closing the bleed valve.

One end of the spring that biases the spring biased arm is attached to the spring biased arm and the other end is attached to a control arm. The control arm is pivotally supported by the float actuator assembly housing. When the control arm is pivoted in one direction, it shifts the spring into a position in which the spring biased arm is biased toward the bleed valve. Pivoting the control arm in the opposite direction shifts the spring into a position in which the spring biased arm is biased away from the bleed valve. The control arm is pivoted in the direction to open the bleed valve by a float that is raised by water. The control arm is pivoted in the other direction to close the bleed valve by the weight of the float assembly when the water level in the sump drops.

THE DRAWINGS

A water powered sump pump with an improved float actuator assembly constructed in accordance with the presently preferred embodiment of the invention is disclosed in the accompanying drawings, wherein:

FIG. 1 is a front elevational view of the pump in the position it occupies when installed in a sump in condition for use;

FIG. 2 is an exploded isometric view of the flow control apparatus;

FIG. 3 is an enlarged sectional view through the flow control apparatus;

FIG. 4 is an enlarged sectional view of the suction generating apparatus;

FIG. 7 is a sectional view of the float actuator assembly taken along lines 7—7 in FIG. 6 with parts broken away.

DETAILED DESCRIPTION

Figure 5:
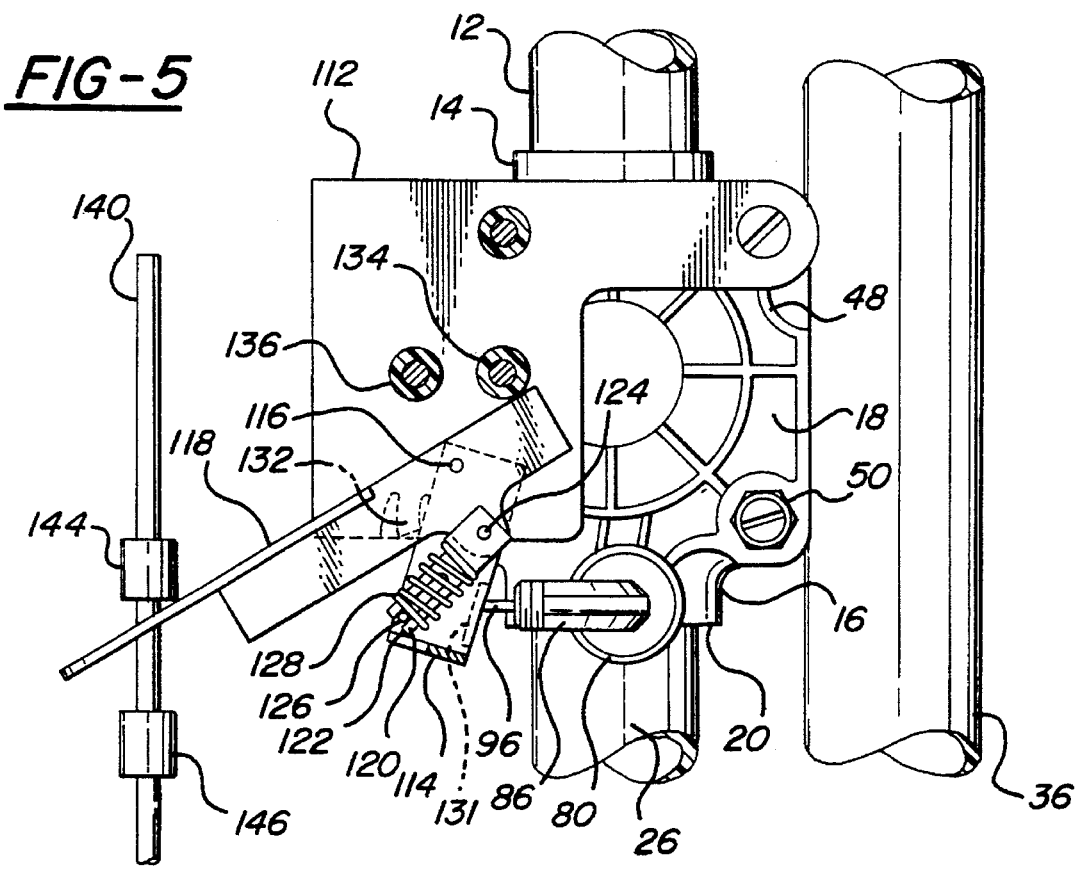
FIG. 5 is an enlarged elevational view of the flow control apparatus and the float actuator assembly with a flow control apparatus bleed valve closed and a side plate removed from the actuator assembly housing.

A sump pump 10 constructed in accordance with the presently preferred embodiment of the invention comprises a liquid inlet line 12 connected to a source (not shown) of water under pressure, such as a potable water system of a municipality. Typically, the pressure of the potable water supply is between 25 and 80 psi. Inlet line 12 may receive water that has passed through a conventional pressure vacuum breaker (not shown). A pressure vacuum breaker permits water to flow to the flow control apparatus, but precludes return flow from the flow control apparatus.

The inlet line 12 is connected to an inlet port 14 of a housing 16 of a flow control apparatus 18. The housing 16 has an outlet port 20 that is connected to an inlet port 22 of a suction generating apparatus 24 by water outlet line 26. The suction generating apparatus 24 has a sump inlet port 28 connected to a drain line 30 and a strainer 32 through which water from a sump S passes when it is drawn into the drain line. The suction generating apparatus 24 also has a discharge port 34 connected to a discharge line 36 which leads to a sewer or other area for disposal.

The control apparatus housing 16 comprises a body 38 having an inlet port 14, an outlet port 20 and a cylindrical partition 40 separating the inlet port from the outlet port. A circular opening 42, in communication with the inlet port 14, is encircled by a seat 44. A passage 46 connects the opening 42 to the outlet port 20. A cap 48 is removably secured to the open side of the body 38 by a plurality of bolts 50 shown in FIG. 2. The confronting ends of the body 38 and the cap 48 are recessed to form an annular groove 52 that is concentric with the seat 44.

A closure 54 normally seals the circular opening 42 and blocks the flow of water from the inlet port 14, through the opening 42, the passage 46 and the outlet port 20. The closure 54 comprises a flexible diaphragm 56 having a web 60 spanning the annular groove 52 and a peripheral enlargement 58 secured in the annular groove. A plug 62 at the center of the diaphragm 56 extends through and seals the opening 64 in the diaphragm. Plug 62 has a flange 66 which seats on the diaphragm 56. A compression spring 68 acts on the flange 66 and the cap 48 to urge the diaphragm 56 into contact with the seat 44 and prevent flow between the inlet port 14 and the outlet port 20. One end of the spring 68 seats on the flange 66 and the opposite end encircles a guide 70 and bears against the cap 48. The force exerted by the spring 68 is sufficient to maintain the closure 54 in sealing contact with the seat 44 when pressure on opposite sides of the diaphragm 56 is substantially equal.

The diaphragm 56 divides the interior of the housing into two compartments. One compartment 72 includes both the inlet 14 and the outlet 20, whereas the other compartment 74 contains the spring 68 and its associated parts. The compartment 72 is at water supply pressure and will be referred to as the uniform pressure compartment. The compartment 74 will be referred to as the variable pressure compartment.

The plug 62 forming part of the diaphragm 56 has a relatively low volume orifice 76 which provides fluid communication between the uniform pressure compartment 72 and the variable pressure compartment 74. When the compartment 74 is sealed from the outside, the pressure in the uniform pressure compartment 72 and the variable pressure compartment 74 will equalize due to water flow through the orifice 76, and the spring 68 will maintain the closure 54 in sealing contact with the seat 44. Since the area of the closure 54 in communication with the uniform pressure compartment 72 is smaller than the area of the closure in communication with the variable pressure compartment 74, water pressure also will tend to maintain sealing contact between the seat 44 and the closure.

A bleed passage 78 is provided in the cap 48 of the flow control apparatus 18 for bleeding water from the variable pressure compartment 74. A fitting 80 with an O-ring seal 82 is screwed into a port 84 on the cap 48 that is in communication with the bleed passage 78. A 90 degree elbow fitting 86 with a passage 88 is screwed into the fitting 80. Internal threads 89 are provided in the exit end of the fitting 86. A known Schroeder or other type valve 90 is screwed directly into the passage 88. The valve 90 includes a fixed valve seat on a tubular member 92 and an axially moveable valve closing member 94 that is spring biased toward the seat on the tubular member 92. A release shaft 96 passes through the tubular member 92 and is fixed to the moveable valve closing member 94. The release shaft 96 extends out of the fitting 86 as shown in FIG. 3 for engagement by an actuator assembly 98 (described below), which forces the release shaft into the passage 89, and lifts the closing member 94 from the valve seat on the member 92 thereby opening the passage 89 and establishing direct communication between the bleed passage 78 and atmosphere. The fitting 80 with the O-ring seal 82 can be rotated to a position which aligns the release shaft 96 with the float actuator assembly 98.

When the valve 90 is open, water is bled from the variable pressure compartment 74 through the bleed passage 78 faster than water flows through the orifice 76 in the plug 62 thereby lowering pressure in the variable pressure compartment. The water that passes through the valve 90 falls into and is mixed with the water in the sump S in which the sump pump 10 is mounted. The pressure of water in the uniform pressure compartment 72 will exert a force on the diaphragm 56 that exceeds the force exerted on the diaphragm by water pressure in the variable pressure compartment 74 and by the spring 68, whereupon the diaphragm will be lifted off the seat 44. Upon the diaphragm 56 being lifted off the seat 44, water will flow from the compartment 72 through the passage 46 and through the outlet port 20. Upon the closure 54 being lifted from the seat 44, the area of the diaphragm 56 in contact with water under pressure from the uniform pressure compartment 72 increases thereby increasing the force holding the flow control apparatus open until the valve 90 is returned to its closed position and the pressure of water in the pressure compartments 72 and equalizes enabling the spring 68 to move the diaphragm onto the seat 44.

The water discharged from the outlet port 20 of the flow control apparatus 18 flows to the suction generating apparatus 24 through a water outlet line 26. Water passes through an inlet screen 100 and enters a nozzle inlet chamber 102. Water is discharged from the chamber 102 at a high velocity through a nozzle 104. The high velocity stream of water leaving the nozzle 104 is directed across a low pressure suction chamber 106 and into a passage 108 through an injector 110. The axis of the passage 108 through the injector 110 is in alignment with the axis of water leaving the nozzle 104 at high speed. Pressure in the suction chamber 106 is reduced and water in the sump is drawn through the strainer 32, the drain line 30, and into the suction chamber. Water drawn into the suction chamber 106 is entrained in the high velocity stream of water leaving the nozzle 104 and carried through the injector 110. Water leaving the injector 110 is forced through a discharge line 36 to a sewer or other disposal area.

The float actuator assembly 98 for opening and closing the valve 90 includes an actuator assembly housing 112 secured to the control apparatus housing 16 by bolts 50. A spring biased arm 114 is pivotally attached to a pivot shaft 116 on the housing 112. A spring direction selector latch or control arm 118 is also pivotally attached to the pivot shaft 116. A spring support and guide 120 with a slot 122 is pivotally attached to the control arm 118 by a pin 124 with a pin 126 on the spring biased arm 114 in the slot 122. A compression spring 128 surrounds the guide 120 and is seated against the upper end 130 of the guide and the pin 126. In the position shown in FIG. 5, the compression spring 128 biases the arm 114 clockwise about the pivot shaft 116 into contact with a stop 132 on a side plate 133 of the actuator assembly housing 112 and away from the release shaft 96 thereby allowing the valve 90 to close. In the position shown in FIG. 6, the compression spring 128 biases the striker arm 114 counterclockwise about the fixed pin 116 thereby moving the release shaft contact plate 131 into contact with the release shaft 96, forcing the release shaft into the fitting 86 and opening the valve 90.

Figure 6:
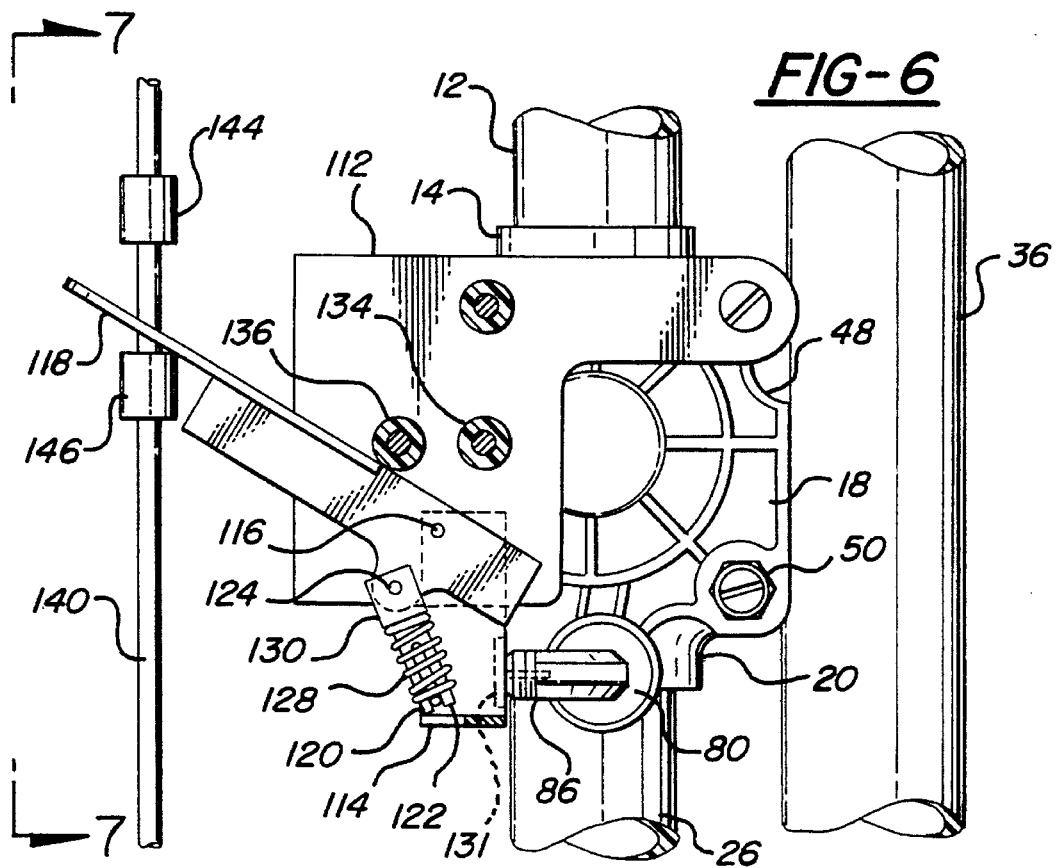
FIG. 6 is an enlarged elevational view of the flow control apparatus and the float actuator assembly with a flow control apparatus bleed valve open and a side plate removed from the actuator assembly housing.

The control arm 118 is pivotable in opposite directions about the fixed shaft 116 between a first latched position in contact with a stop 134 as shown in FIG. 5 and a second latched position in contact with a stop 136 as shown in FIG. 6. The spring 128 biases the control arm 118 toward the stop 134 when the control arm is in the position shown in FIG. 5 and toward the stop 136 when the control arm is in the position shown in FIG. 6. The control arm 118 is pivoted about the pin 116 by a float assembly 138.

The float assembly 138 includes a generally vertical rod 140 that passes through an aperture in a fixed guide plate 142 clamped to the water outlet line 26 and an aperture through the control arm 118. Adjustable collars 144 and 146 on the rod 140 limit vertical movement of the rod 140 relative to the control arm 118. Two adjustable collars 147 and 149 limit vertical movement of the float 148 relative to the rod 140. These adjustments allow a substantial range of water levels and precise adjustment of the water levels at which the sump pump 10 is turned on and off. The float 148 is a plastic member with an open bottom that eliminates float leakage problems by enabling water to drain from the float every time the float is clear of the sump water.

The force required to pivot the control arm 118 is relatively small. The force exerted by the spring biased arm 114 as a result of the force of the compression spring 128 is substantially larger than the maximum of force available from the float 148.

The disclosed embodiment is representative of a presently preferred embodiment of the invention, but is intended to be illustrative rather than definitive thereof. The invention is defined in the claims.

I claim:

1. A water powered sump pump having an inlet line connectable to a source of water under pressure; a flow control apparatus in communication with the inlet line; a fluid outlet line in communication with the flow control apparatus; a water powered suction generating apparatus in communication with the fluid outlet line, a drain line located in a sump in which water may collect, and with a fluid discharge line, said water powered suction generating apparatus responsive to the flow of water from said fluid outlet line to create a low pressure sufficient to entrain water from said drain line and discharge water through the fluid discharge line; the improvement wherein said flow control apparatus comprises a housing having a first chamber in communication with said inlet line; an outlet in communication with the fluid outlet line, a passage connecting the first chamber to the outlet; a closure moveable from a first position in which the passage is closed to a second position in which the passage is open; a resilient member yieldably biasing the closure to said first position; a variable pressure second chamber in said housing separated from said first chamber by said closure; a relatively low volume water passage orifice between the first chamber and the second chamber; a bleed valve in communication with the variable pressure second chamber, said bleed valve including a release shaft which can be forced in one direction to open the bleed valve and connect the variable pressure second chamber to the outside of said housing thereby reducing pressure in said second chamber and enabling the pressure of water in said first chamber to move said closure from said first position to said second position whereby water may flow from said source through said inlet line, said housing and said outlet line, and which can be forced in a second direction to close the bleed valve thereby permitting pressure to increase in the variable pressure second chamber and return said closure to said first position; a float actuator assembly including an actuator housing mounted in a fixed position relative to said bleed valve, a spring biased arm pivotally supported on the actuator housing and engageable with the bleed valve release shaft, a control arm pivotally attached to the actuator housing and pivotable between a first location and a second location, a first stop that limits pivotal movement of the control arm when the control arm is in said first location and a second stop that limits pivotal movement of the control arm when the control arm is in said second location, a spring in engagement with the spring biased arm and the control arm that forces the spring biased arm to move toward a valve open position in which the bleed valve release shaft opens the bleed valve when the control arm is in said first location and that forces the spring biased arm to move toward a valve closed position in which the bleed valve release shaft closes the bleed valve when the control arm is in said second location; and a float assembly connected to the control arm that pivots the control arm to the first location in response to a predetermined rise in the water level in the sump and pivots the control arm to the second location in response to a predetermined drop in the water level in the sump.

2. The construction according to claim 1 wherein said float actuator assembly includes a stop which limits pivotal movement of the spring biased arm.

3. A water powered sump pump having an inlet line connectable to a source of water under pressure; a flow control apparatus in communication with the inlet line; a fluid outlet line in communication with the flow control apparatus; a water powered suction generating apparatus in communication with the fluid outlet line, a drain line located in a sump in which water may collect, and with a fluid discharge line, said water powered suction generating apparatus responsive to the flow of water from said fluid outlet line to create a low pressure sufficient to entrain water from said drain line and discharge water through the fluid discharge line; the improvement wherein said flow control apparatus comprises a housing having a first chamber in communication with said inlet line; an outlet in communication with the fluid outlet line, a passage connecting the first chamber to the outlet; a closure moveable from a first position in which the passage is closed to a second position in which the passage is open; a resilient member yieldably biasing the closure to said first position; a variable pressure second chamber in said housing separated from said first chamber by said closure; a relatively low volume water passage orifice between the first chamber and the second chamber; a bleed valve in communication with the variable pressure second chamber, said bleed valve including a release shaft which can be forced in one direction to open the bleed valve and connect the variable pressure second chamber to the outside of said housing thereby reducing pressure in said second chamber and enabling the pressure of water in said first chamber to move said closure from said first position to said second position whereby water may flow from said source through said inlet line, said housing and said outlet line, and which can be forced in a second direction to close the bleed valve thereby permitting pressure to increase in the variable pressure second chamber and return said closure to said first position; a float actuator assembly, including an actuator housing, mounted in a fixed position relative to said bleed valve, a spring biased arm pivotally supported on the actuator housing and engageable with the bleed valve release shaft, a control arm pivotally attached to the actuator housing and pivotable between a first location and a second location, a spring in engagement with the spring biased arm and the control arm that forces the spring biased arm to move toward a valve open position in which the bleed valve release shaft opens the bleed valve when the control arm is in said first location and that forces the spring biased arm to move toward a valve closed position in which the bleed valve release shaft closes the bleed valve when the control arm is in said second location; and a float assembly connected to the control arm that pivots the control arm to the first location in response to a predetermined rise in the water level in the sump and pivots the control arm to the second location in response to a predetermined drop in the water level in the sump, and wherein said float assembly includes a rod connected to the control arm and passing through a guide, a float slidable on the rod, and adjustable collars on the rod that limit movement of the float relative to the rod.

4. A water powered sump pump having an inlet line connectable to a source of water under pressure; a flow control apparatus in communication with the inlet line; a fluid outlet line in communication with the flow control apparatus; a water powered suction generating apparatus in communication with the fluid outlet line, a drain line located in a sump in which water may collect, and with a fluid discharge line, said water powered suction generating apparatus responsive to the flow of water from said fluid outlet line to create a low pressure sufficient to entrain water from said drain line and discharge water through the fluid discharge line; the improvement wherein said flow control apparatus comprises a housing having a first chamber in communication with said inlet line; an outlet in communication with the fluid outlet line, a passage connecting the first chamber to the outlet; a closure moveable from a first position in which the passage is closed to a second position in which the passage is open; a resilient member yieldably biasing the closure to said first position; a variable pressure second chamber in said housing separated from said first chamber by said closure; a relatively low volume water passage orifice between the first chamber and the second chamber; a bleed valve in communication with the variable pressure second chamber, said bleed valve including a release shaft which can be forced in one direction to open the bleed valve and connect the variable pressure second chamber to the outside of said housing thereby reducing pressure in said second chamber and enabling the pressure of water in said first chamber to move said closure from said first position to said second position whereby water may flow from said source through said inlet line, said housing and said outlet line, and which can be forced in a second direction to close the bleed valve thereby permitting pressure to increase in the variable pressure second chamber and return said closure to said first position; a float actuator assembly including an actuator housing mounted in a fixed position relative to said bleed valve, a spring biased arm pivotally supported on the actuator housing and engageable with the bleed valve release shaft, a control arm pivotally attached to the actuator housing and pivotable between a first location and a second location, a spring in engagement with the spring biased arm and the control arm that forces the spring biased arm to move toward a valve open position in which the bleed valve release shaft opens the bleed valve when the control arm is in said first location and that forces the spring biased arm to move toward a valve closed position in which the bleed valve release shaft closes the bleed valve when the control arm is in said second location; and a float assembly connected to the control arm that pivots the control arm to the first location in response to a predetermined rise in the water level in the sump and pivots the control arm to the second location in response to a predetermined drop in the water level in the sump, and wherein said float assembly includes a rod slidably received in an aperture through the control arm and passing through a guide, a float retained on the rod, and at least one adjustable collar on the rod that limits movement of the rod relative to the control arm wherein said float actuator assembly includes a stop which limits pivotal movement of the spring biased arm.

5. The construction according to claim 4 wherein the float is slidable on the rod and at least one adjustable float collar on the rod limits movement of the float relative to the rod.

\* \* \* \* \*